Aug. 26, 1924.  
E. C. E. LORD  
1,506,351  
PROCESS FOR DETERMINING THE DYE ADSORPTION OF SOILS  
Filed Dec. 13, 1923
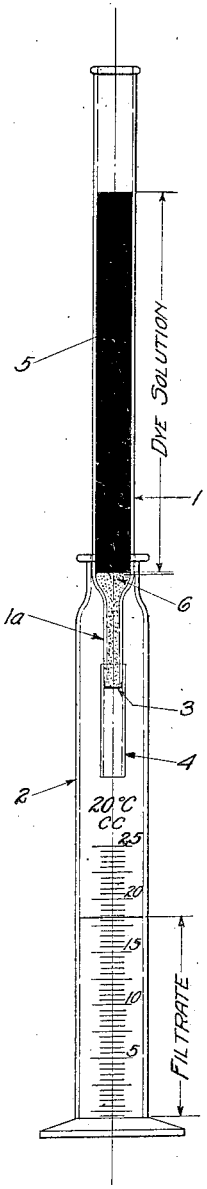

Patented Aug. 26, 1924.

1,506,351

UNITED STATES PATENT OFFICE.

EDWIN C. E. LORD, OF WASHINGTON, DISTRICT OF COLUMBIA, DEDICATED, BY MESNE ASSIGNMENTS, TO THE CITIZENS OF THE UNITED STATES OF AMERICA.

PROCESS FOR DETERMINING THE DYE ADSORPTION OF SOILS.

Application filed December 13, 1923. Serial No. 680,485.

(FILED UNDER THE ACT OF MARCH 3, 1883, 22 STAT. L., 625.)

*To all whom it may concern:*

Be it known that I, EDWIN C. E. LORD, a citizen of the United States of America, and an employee of the United States Department of Agriculture, residing at Florence Court, Washington, District of Columbia, have invented a new and useful Process for Determining the Dye Adsorption of Soils.

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

My process is based on the decolorization of a dye solution when brought in contact with soil.

The apparatus employed in this determination is shown in the accompanying drawing which shows an elevation of the apparatus.

The apparatus consists of a filtration tube 1 of about 20 c. c. capacity inserted in a 25 c. c. graduate 2. The tube 1 should measure about 6 inches by one-half inch inside diameter and be drawn at the lower end 1ª to a straight stem one-eighth inch inside diameter and closed by a small filter paper disc 3, held in place by a ground glass stopper tube 4 enclosing the stem 1ª for a distance of approximately one-fourth inch.

The process consists in passing a solution 5, preferably a basic aniline dye (crystal violet) dissolved in 1000 parts distilled water, through a sample of air dried soil 6 until the latter is completely saturated with dye, when the quantity of dye absorbed is calculated from the volume of decolorized solution.

The determination is carried out by mixing a small quantity of the soil sample (0.20 gram) in a small separatory funnel with from one to three cubic centimeters of the dye solution until the soil is completely coagulated and the solution decolorized, when the solution containing the coagulated material is run into the filtering tube and allowed to drain into the graduate 2. Additional dye is then added and the filtration allowed to continue until a colorization appears in the liquid passing the filter paper cap which indicates the end point of the reaction.

I claim:

A process for determining the dye adsorption of soils for estimating their physical properties in road improvement investigations, consisting in mixing a small quantity of soil with sufficient dye solution to cause coagulation of the soil, the solution being thereby decolorized, transferring the whole to a filtering tube as described, where the decolorized dye solution is drained through the tube into a graduate, in passing further quantities of dye solution through the soil in said tube until the soil becomes saturated with dye and the filtrate in the tube shows a slight coloration, and in finally determining the quantity of dye adsorbed from the volume of the decolorized filtrate collected in the graduate tube.

EDWIN C. E. LORD.